United States Patent
Lee

(10) Patent No.: US 8,908,268 B2
(45) Date of Patent: Dec. 9, 2014

(54) INFRARED OPTICAL LENS SYSTEM

(71) Applicant: Samsung Techwin Co., Ltd., Changwon (KR)

(72) Inventor: Byoung-guy Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 104 days.

(21) Appl. No.: 13/677,443

(22) Filed: Nov. 15, 2012

(65) Prior Publication Data

US 2013/0120832 A1 May 16, 2013

(30) Foreign Application Priority Data

Nov. 16, 2011 (KR) ........................ 10-2011-0119773

(51) Int. Cl.
G02B 13/14 (2006.01)
G02B 9/10 (2006.01)
G02B 13/00 (2006.01)

(52) U.S. Cl.
CPC ...... *G02B 13/14* (2013.01); *G02B 9/10* (2013.01); *G02B 13/003* (2013.01)
USPC ............ 359/356; 359/355; 359/717; 359/795

(58) Field of Classification Search
CPC ............ G02B 1/00; G02B 1/041; G02B 9/00; G02B 9/04; G02B 9/10; G02B 9/12; G02B 9/14; G02B 9/16; G02B 13/008; G02B 13/14; G02B 13/146

USPC ......... 359/350–361, 642, 716–717, 784–785, 359/793, 795
See application file for complete search history.

(56) References Cited

U.S. PATENT DOCUMENTS

| | | | | |
|---|---|---|---|---|
| 2,659,271 | A | * | 11/1953 | Treuting .................. 359/356 |
| 3,160,700 | A | * | 12/1964 | Snyder .................... 359/356 |
| 4,431,917 | A | | 2/1984 | Gibbons |
| 4,494,819 | A | * | 1/1985 | Lidwell ................... 359/356 |
| 4,999,005 | A | | 3/1991 | Cooper |
| 5,737,120 | A | * | 4/1998 | Arriola .................... 359/356 |
| 7,042,656 | B2 | * | 5/2006 | Chen et al. .............. 359/716 |
| 7,672,045 | B2 | * | 3/2010 | Baker ...................... 359/356 |
| 2012/0113504 | A1 | * | 5/2012 | Tanami et al. ........... 359/356 |
| 2012/0212807 | A1 | * | 8/2012 | Kawaguchi .............. 359/356 |

FOREIGN PATENT DOCUMENTS

| | | |
|---|---|---|
| JP | 10339842 A | 12/1998 |
| JP | 2003295052 A | 10/2003 |
| JP | 200917495 A | 1/2009 |
| JP | 2011-128538 A | 6/2011 |

* cited by examiner

*Primary Examiner* — Thong Nguyen
(74) *Attorney, Agent, or Firm* — Sughrue Mion, PLLC

(57) ABSTRACT

An infrared optical lens system including: a first lens which comprises a crystalline material; and a second lens which comprises an amorphous material and is formed by using molding processing, wherein a refractive index of the first lens is greater than that of the second lens, and the first lens and the second lens are disposed in the order from an object to an image.

17 Claims, 15 Drawing Sheets

INFRARED OPTICAL LENS SYSTEM

CROSS-REFERENCE TO RELATED PATENT APPLICATION

This application claims priority from Korean Patent Application No. 10-2011-0119773, filed on Nov. 16, 2011, in the Korean Intellectual Property Office, the disclosure of which is incorporated herein in its entirety by reference.

BACKGROUND

1. Field

Apparatuses consistent with exemplary embodiments relate to infrared optical lens systems.

2. Description of the Related Art

As all objects or bodies irradiate infrared rays at temperatures above absolute zero (0° K), infrared monitoring camera systems which detect infrared rays are used in various fields. For example, infrared monitoring camera systems can be used in monitoring fires, which may break out in large factories or in mountain areas, or in preventing the spread of contagious diseases by checking the temperatures of, for example, people suspected of having influenza. Infrared monitoring camera systems may also be used for military purposes in monitoring various areas, such as border areas, combat areas, etc.

As the applications of infrared monitoring camera systems have constantly expanded, demands for compact and high performance infrared optical lens systems that can be manufactured at low costs have gradually increased.

SUMMARY

One or more embodiments provide high performance infrared optical lens systems that may be manufactured at low costs.

According to an aspect of an exemplary embodiment, there is provided an infrared optical lens system including: a first lens which comprises a crystalline material; and a second lens which comprises an amorphous material and is formed by using molding processing, wherein a refractive index of the first lens is greater than that of the second lens, and the first lens and the second lens are disposed in the order from an object to an image.

A focal distance of the infrared optical lens system may be in the range of about 50 mm to about 150 mm.

The first lens may include at least one aspheric surface.

The first lens may include an aspheric surface that faces the image.

The second lens may include at least one aspheric surface.

A surface of the first lens which faces the image may be an aspheric surface.

The infrared optical lens system may further include a third lens disposed next to a surface of the second lens which faces the image.

The third lens may include an amorphous material.

A refractive index of the first lens may be from about 3.2 to about 4.1.

A refractive index of the second lens may be from about 2.45 to about 2.65.

According to an aspect of an exemplary embodiment, by using a crystalline material and an amorphous material and setting a refractive index of a first lens to be greater than that of a second lens, a low cost and high performance infrared optical telephoto lens system having a focal distance in the range of about 50 mm to about 150 mm may be implemented.

In addition, aberrations may be easily corrected by forming at least one of the first lens and the second lens to have at least one aspheric surface.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

Hereinafter, the inventive concept will be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. Unless defined otherwise, technical and scientific terms used herein have the same meaning as is commonly understood by one of skill in the art to which this inventive concept belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and are used only to classify one element from another.

Figure 1:
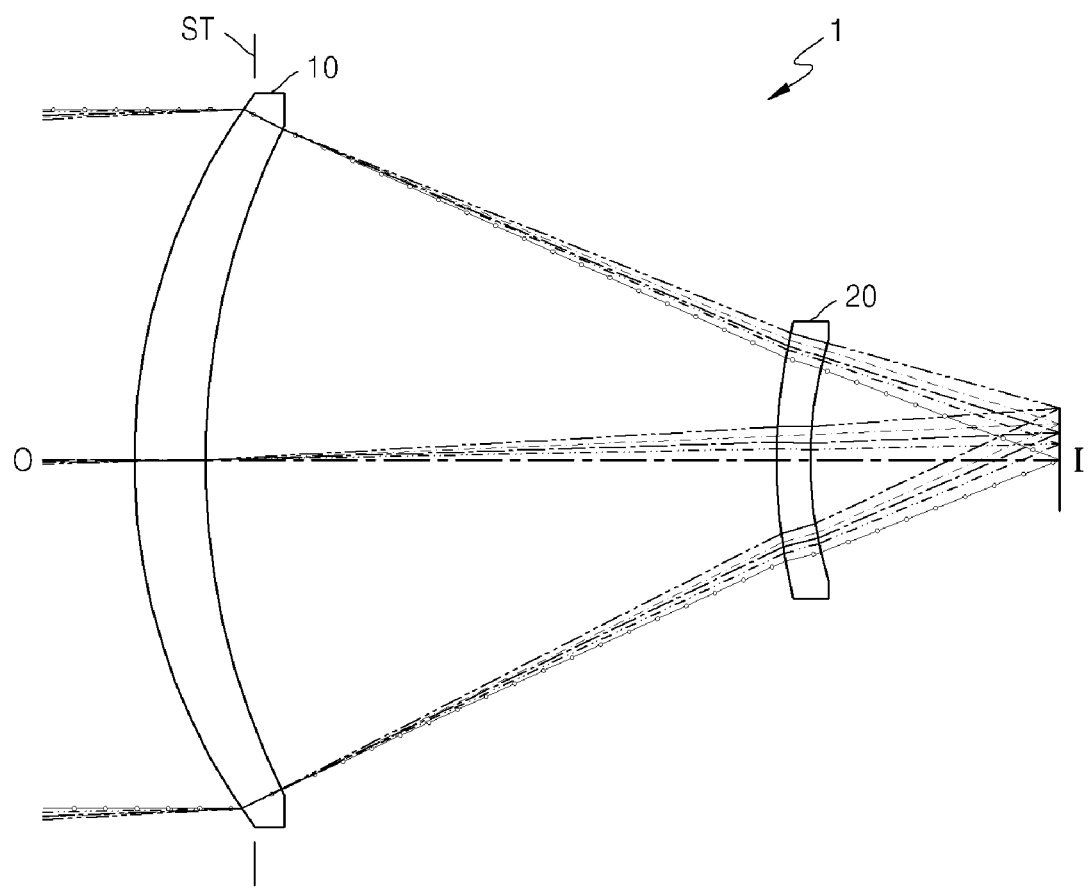
FIG. 1 is a diagram schematically illustrating an infrared optical lens system according to an exemplary embodiment.
Figure 6:
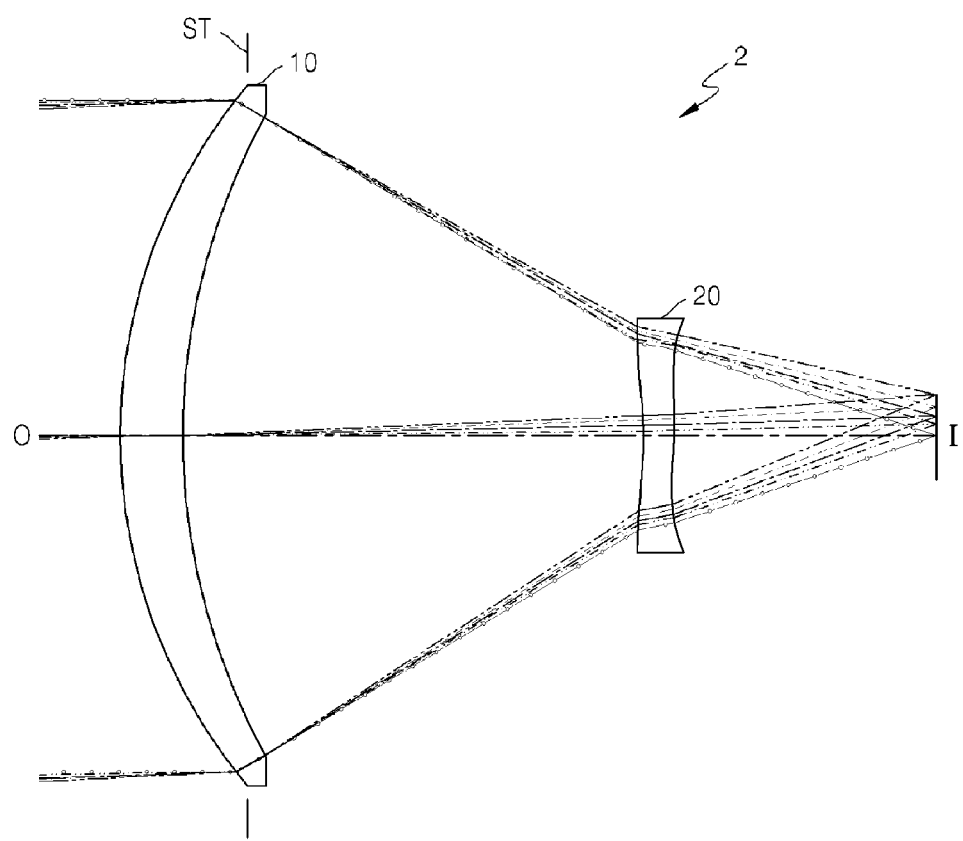
FIG. 6 is a diagram schematically illustrating an infrared optical lens system according to another exemplary embodiment.
Figure 11:
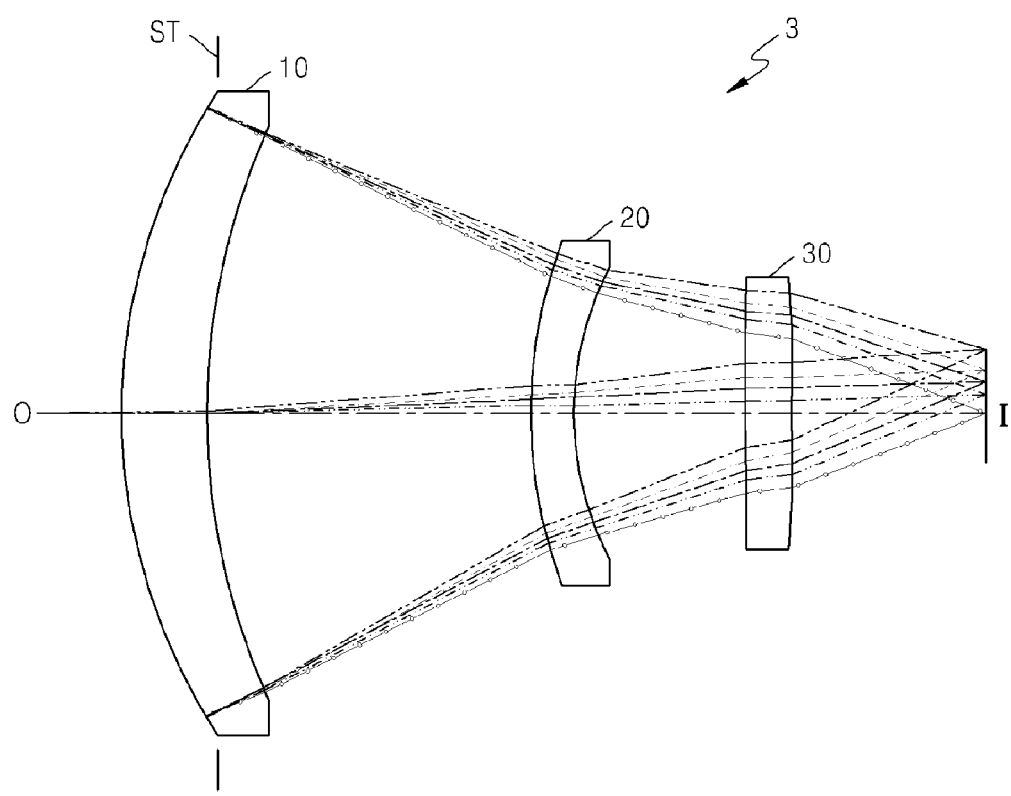
FIG. 11 is a diagram schematically illustrating an infrared optical lens system according to still another exemplary embodiment.

FIGS. 1, 6, and 11 are diagrams respectively illustrating infrared optical lens systems 1, 2, and 3 according to exemplary embodiments.

Referring to FIGS. 1, 6, and 11, the infrared lens systems 1, 2, and 3 each include a first lens 10 and a second lens 20 in the order from an object O to an image I, and the infrared optical lens system 3 may further include a third lens 30. An aperture ST may be disposed in a vicinity of a surface of the first lens 10 that faces the object O.

The first lens 10 may include a material different from that of the second lens 20. For example, the first lens 10 may include a crystalline material that transmits infrared rays, and the second lens 20 may include a amorphous material, such as amorphous glass, that transmits infrared rays. The amorphous material may include a chalcogenide material, according to an exemplary embodiment. The third lens 30 also may include an amorphous material, such as amorphous glass, that may transmit infrared rays, and at least one of the second lens 20 and the third lens 30 may be formed by using molding processing.

The crystalline material may include at least one selected from the group consisting of germanium, ZnSe, ZnS, sapphire and silicon, and the amorphous material may include AMTIR (for example, AMTIR4, etc.) of Amorphours Materials Co. or GASIR (for example, GASIR 1, etc.) of Umicore Co., wherein the AMTIR and the GASIR are model names.

If a lens system is formed of only a crystalline material such as germanium, a compact lens system may be easily formed, but it is difficult to completely remove chromatic aberration. In addition, aspheric surfaces have to be used to remove the chromatic aberration, but it is difficult to stably maintain the performance of lenses and costs are increased. On the other hand, if a lens system is formed of only an amorphous material, the lens system may be easily made, but optical performance thereof is deteriorated, and thus, it is difficult to embody a heat image, and an optical element such as a zone plate has to be separately disposed to reduce the chromatic aberration.

However, according to the embodiments, by using the first lens 10 including a crystalline material having excellent optical characteristics and the second lens 20 or/and the third lens 30 that may be manufactured at comparatively low costs by using a molding process, it may be possible to reduce overall manufacturing costs as well as to maintain high optical performance without using an optical element such as a zone plate.

Each of the infrared optical lens systems 1, 2, and 3 according to the present embodiments has a focal distance in the range of about 50 mm to about 150 mm and may be used in a telephoto lens system.

The first lens 10 may include at least one aspheric surface. For example, a large spherical aberration that may occur in a telephoto lens system may be stably removed by forming a surface of the first lens 10 that faces the image I as an aspheric surface. According to another exemplary embodiment, a surface of the first lens 10 that faces the image I and another surface of the first lens 10 that faces the object O may be aspheric surfaces.

The second lens 20 may include at least one aspheric surface in order to remove comatic aberration. For example, a surface of the second lens 20 that faces the image I may be an aspheric surface, or a surface of the second lens 20 that faces the object O and another surface of the second lens 20 that faces the image I may be aspheric surfaces.

A refractive index of the first lens 10 may be greater than that of the second lens 20. For example, a chromatic aberration of the first and second lenses 10 and 20 may be easily removed by differently setting the refractive index of the first lens 10 and the refractive index of the second lens 20 so that the refractive index of the first lens 10 is from about 3.2 to about 4.1 and the refractive index of the second lens 20 is from about 2.45 to about 2.65 on the basis of a wavelength of 10 μm.

Since the refractive index of the first lens 10 is greater than that of the second lens 20, the infrared optical lens systems 1, 2, and 3 may be compactly formed. If the refractive index of the first lens 10 is not within the above ranges, a backside focal length (BFL) of the infrared optical lens system may become short. If the refractive index of the second lens 20 is not within the above ranges, it is difficult to correct the chromatic aberration and manufacturing costs may increase.

As described above, by using materials having different refractive indexes, the infrared optical lens systems 1, 2, and 3, each having high optical performance by removing the chromatic aberration, may be provided without using an auxiliary optical element such as a diffraction plate. In addition, by using an amorphous material, manufacturing time and costs of the second lens 20 and/or the third lens 30 may be lowered through a molding process.

The aspheric surfaces described above may be defined as follows.

When an optical axis lies in an x-direction, and a direction perpendicular to the optical axis is a y-direction, an aspheric shape of a lens of the infrared optical lens systems 1, 2, and 3 according to the embodiments may be represented by the equation below, wherein a proceeding direction of a beam is positive. Here, x denotes a distance from the apex of the lens in an optical axis direction, and y denotes a distance in a direction perpendicular to the optical axis direction, k denotes a conic constant, a4, a6, and a8 each denote an aspheric coefficient, and c denotes an inverse number (1/R) of a radius of curvature at the vertex of the lens.

$$x = \frac{cy^2}{1 + \sqrt{1 - (1+k)c^2 y^2}} + a_4 y^4 + a_6 y^6 + a_8 y^8$$

Design data of the infrared optical lens systems 1, 2, and 3 according to the embodiments will now be described. Hereinafter, Sn denotes a surface number, R denotes a radius of curvature, Dn denotes a thickness at a center of a lens or an interval between lenses, and f denotes a total focal distance of each of the infrared optical lens systems 1, 2, and 3.

First Embodiment

Table 1 shows design data of the infrared optical lens system 1 according to the embodiment illustrated in FIG. 1, and Table 2 shows aspheric coefficients of the infrared optical lens system 1 illustrated in FIG. 1.

In the embodiment illustrated in FIG. 1, the first lens 10 includes germanium and the second lens 20 includes GASIR1. The first lens 10 may have a positive refractive power, the second lens 20 may have a negative refractive power, and the aperture ST is located in a vicinity of the first lens 10 that faces the object O.

F=100 mm
Fno=1.4

TABLE 1

| # | R | Dn | Material |
|---|---|---|---|
| S1 (ST) | 63.4919 | 7 | Germanium |
| S2* | 75.6267 | 58.6 | |
| S3 | 59.0332 | 3.5 | GASIR1 |
| S4* | 47.8040 | 25.5 | |

TABLE 2

| # | $a_4$ | $a_6$ | $a_8$ |
|---|---|---|---|
| 2 | 2.6402E−08 | 3.0932E−12 | 1.9245E−16 |
| 4 | 5.0617E−06 | 3.4459E−09 | 3.2245E−11 |

Figure 2:
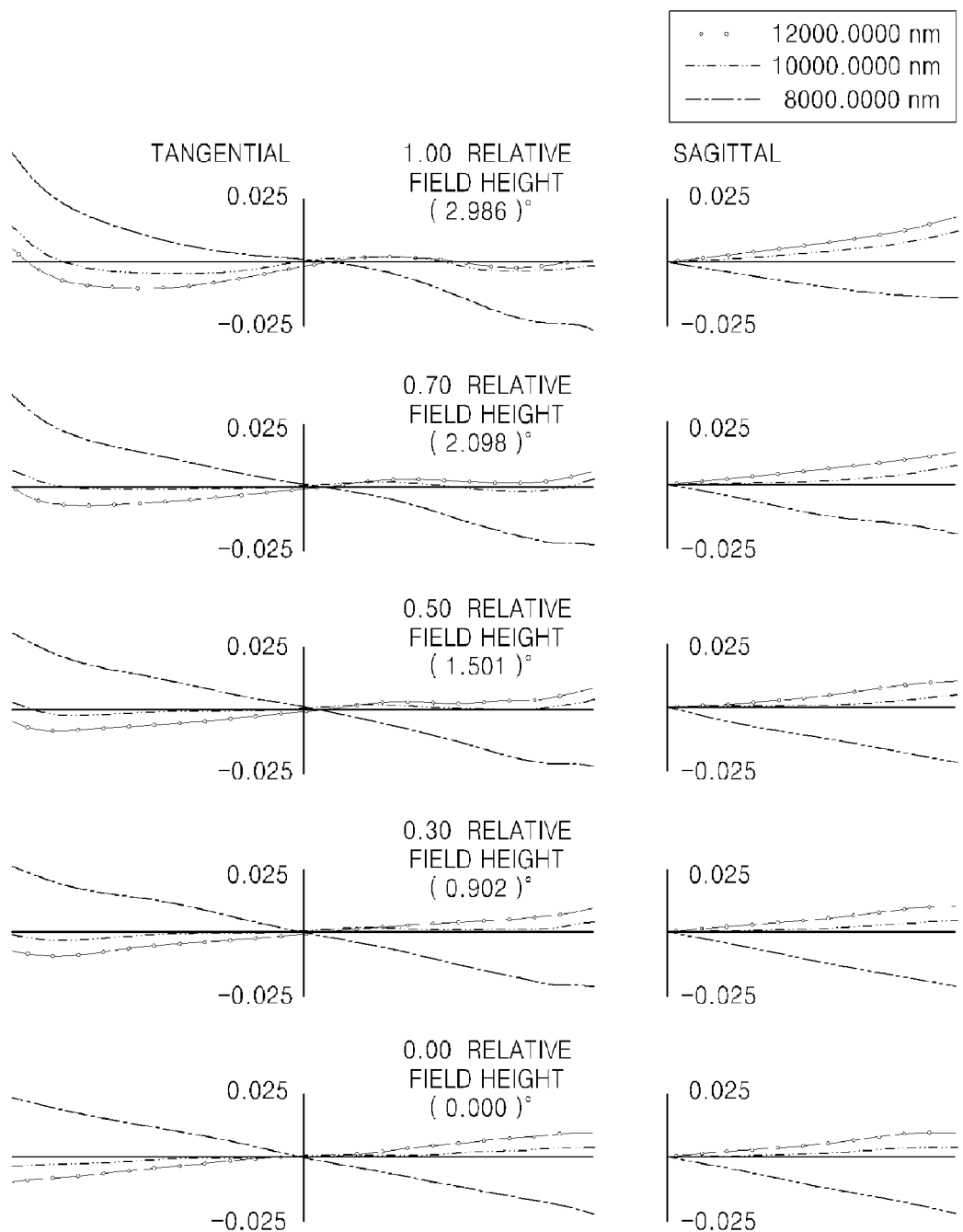
FIG. 2 illustrates field comatic aberrations of the infrared optical lens system illustrated in FIG. 1, according to an exemplary embodiment.
Figure 3:
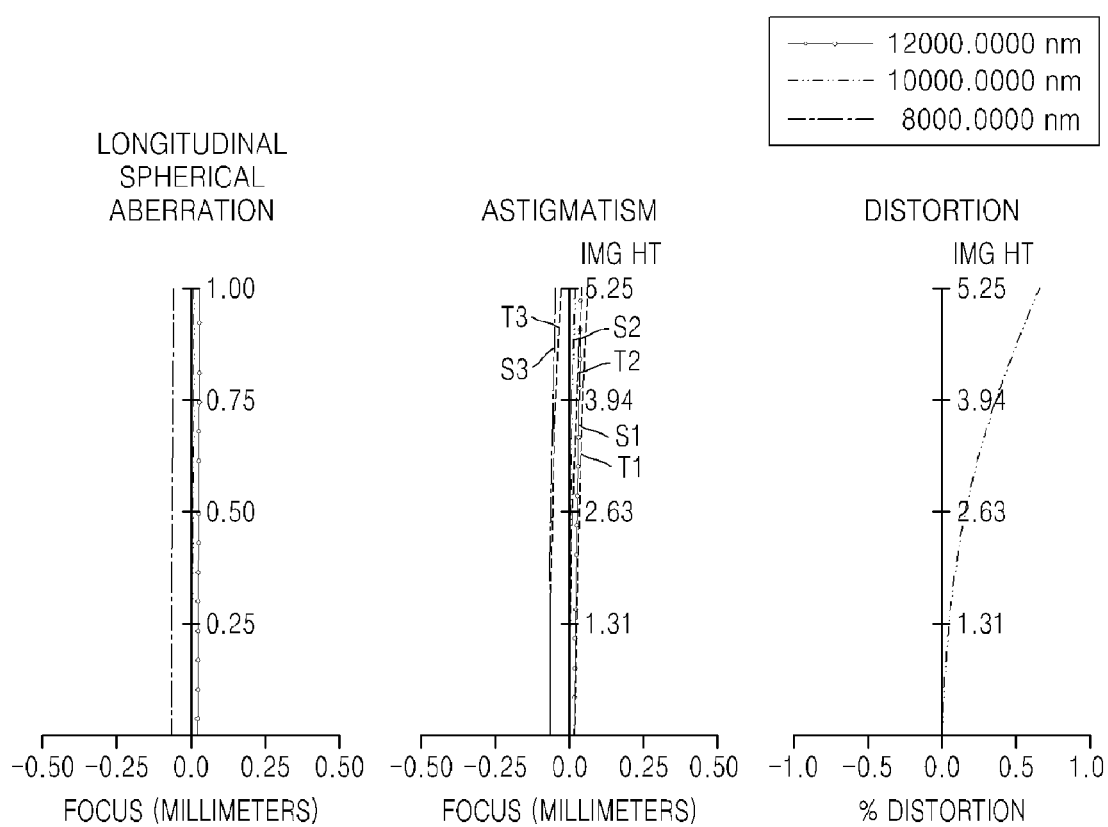
FIG. 3 illustrates longitudinal spherical aberrations, astigmatism, and distortion aberrations of the infrared optical lens system illustrated in FIG. 1, according to an exemplary embodiment.
Figure 4:
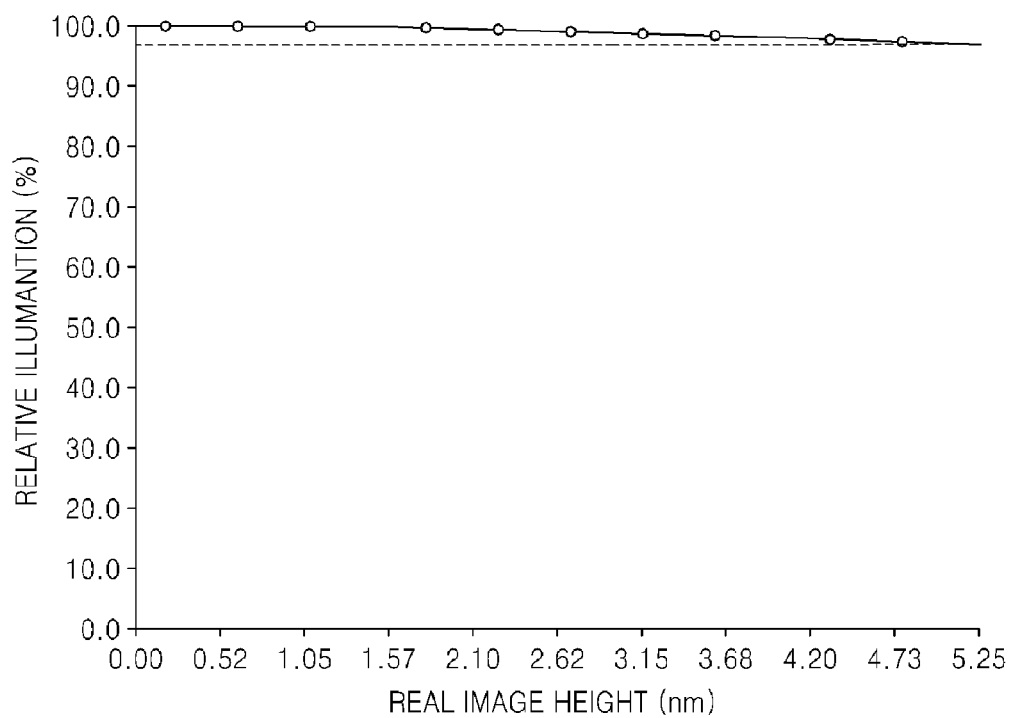
FIG. 4 illustrates a relative illumination of the infrared optical lens system illustrated in FIG. 1, according to an exemplary embodiment.
Figure 5:
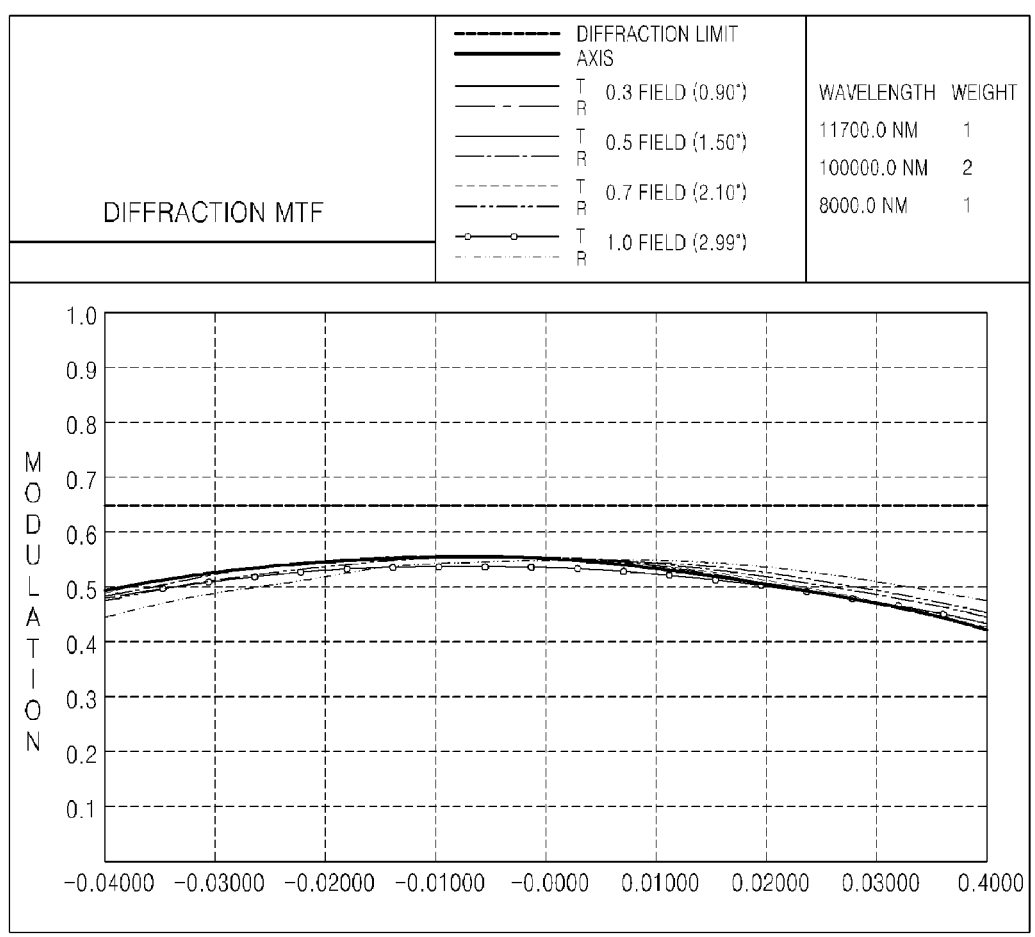
FIG. 5 illustrates a through focus modulation transfer function (MTF) graph of the infrared optical lens system illustrated in FIG. 1, according to an exemplary embodiment.

FIG. 2 illustrates field comatic aberrations of the infrared optical lens system 1 illustrated in FIG. 1, and FIG. 3 illustrates longitudinal spherical aberrations, astigmatism, and distortion aberrations of the infrared optical lens system 1 illustrated in FIG. 1. FIG. 4 illustrates a relative illumination of the infrared optical lens system 1 illustrated in FIG. 1, and FIG. 5 illustrates a through focus modulation transfer function (MTF) graph of the infrared optical lens system 1 illustrated in FIG. 1. In an astigmatic field curve of FIG. 3, a dotted line denotes tangential astigmatic aberration, and a solid line denotes sagittal astigmatic aberration.

Referring to Table 2 and FIGS. 2 through 5, in the infrared optical lens system 1 according to the embodiment of FIG. 1, the first lens 10 has only one aspheric surface which faces the image I. Although only one surface of the first lens 10 is an aspheric surface, spherical aberration may be effectively removed.

Second Embodiment

Table 3 shows design data of the infrared optical lens system 2 according to the embodiment illustrated in FIG. 6, and Table 4 shows aspheric coefficients of the infrared optical lens system 2 illustrated in FIG. 6.

In the embodiment of FIG. 6, the first lens 10 includes germanium and the second lens 20 includes AMTIR4. The first lens 10 may have a positive refractive power, the second lens 20 may have a negative refractive power, and the aperture ST is located in a vicinity of the first lens 10 that faces the object O.

F=133 mm
Fno=1.6

TABLE 3

| # | R | Dn | material |
|---|---|---|---|
| S1 (ST) | 68.1520 | 8 | germanium |
| S2* | 84.5692 | 56.7203 | |
| S3* | −49.6157 | 4 | AMTIR4 |
| S4* | −108.2201 | 32.2797 | |

TABLE 4

| # | $a_4$ | $a_6$ | $a_8$ |
|---|---|---|---|
| 2 | 1.1178E−08 | 9.3737E−13 | 8.9592E−17 |
| 3 | 4.4592E−05 | 6.1558E−08 | — |
| 4 | 4.5073E−05 | 1.8437E−08 | 3.0997E−12 |

Figure 7:
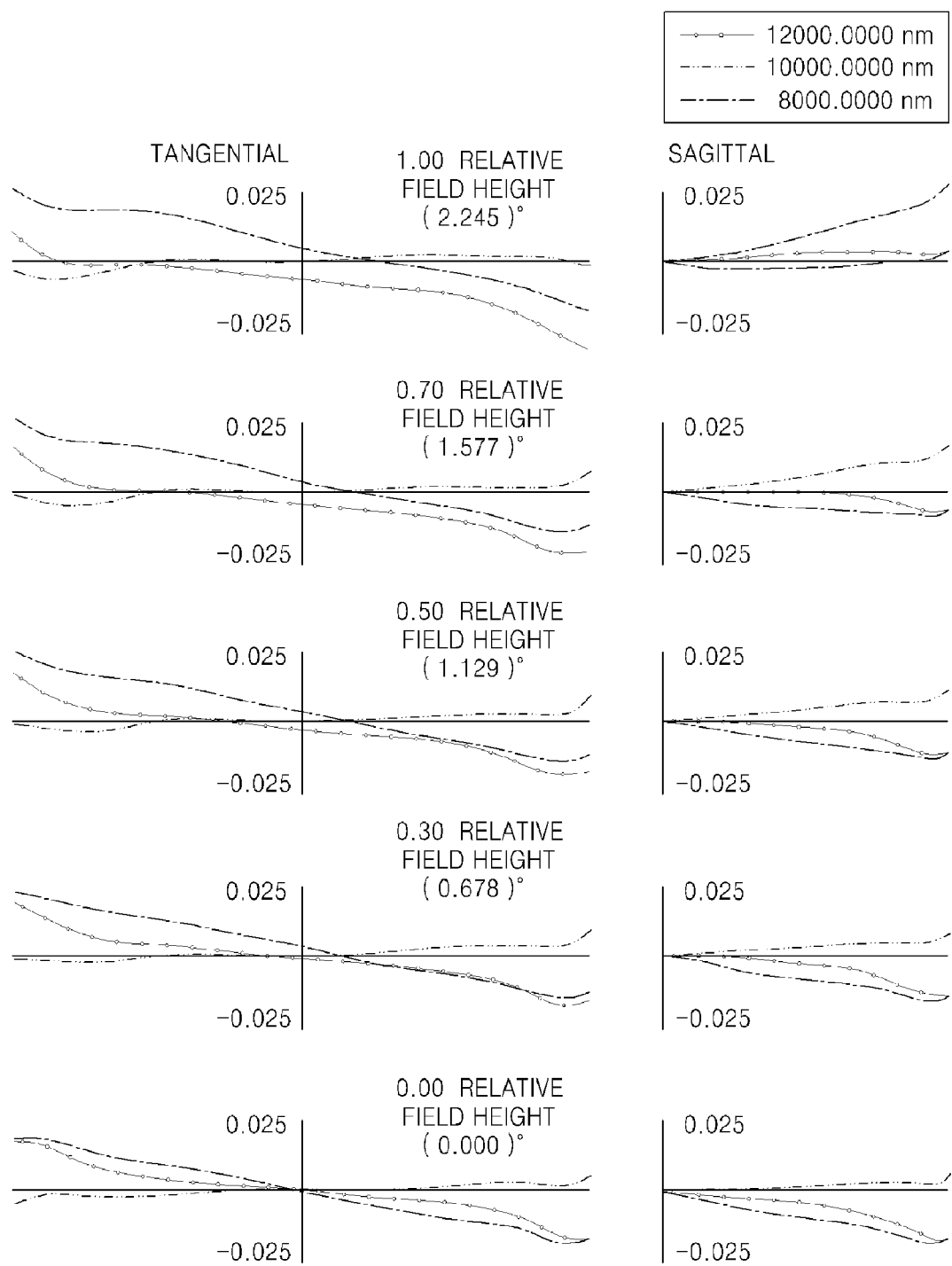
FIG. 7 illustrates field comatic aberrations of the infrared optical lens system illustrated in FIG. 6, according to an exemplary embodiment.
Figure 8:
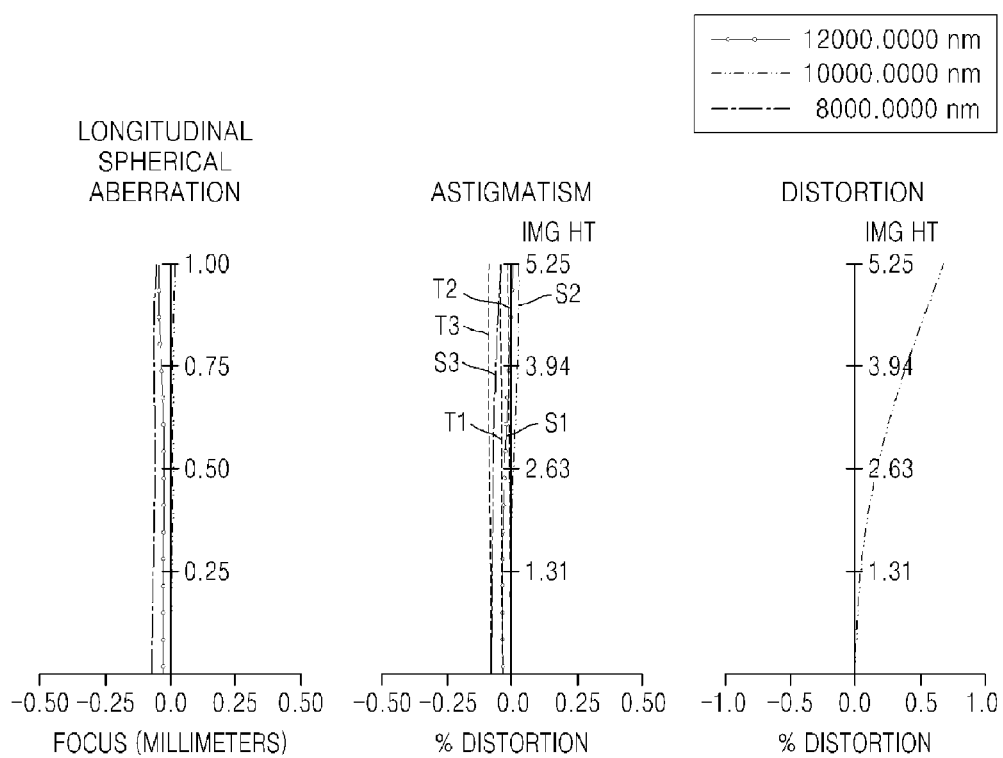
FIG. 8 illustrates longitudinal spherical aberrations, astigmatism, and distortion aberrations of the infrared optical lens system illustrated in FIG. 6, according to an exemplary embodiment.
Figure 9:
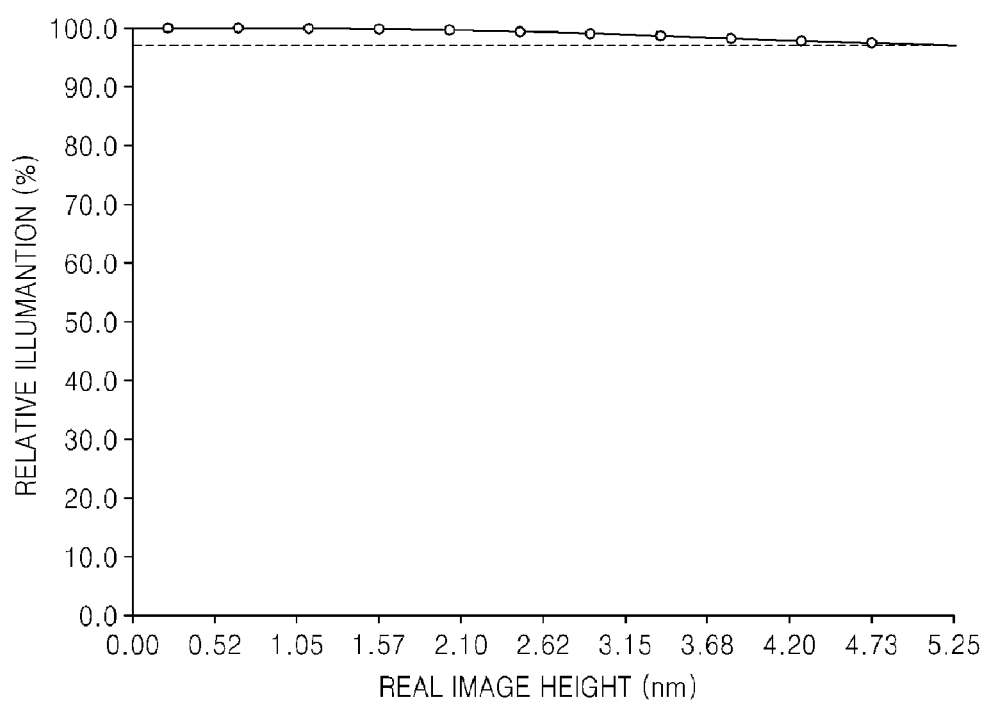
FIG. 9 illustrates a relative illumination of the infrared optical lens system illustrated in FIG. 6, according to an exemplary embodiment.
Figure 10:
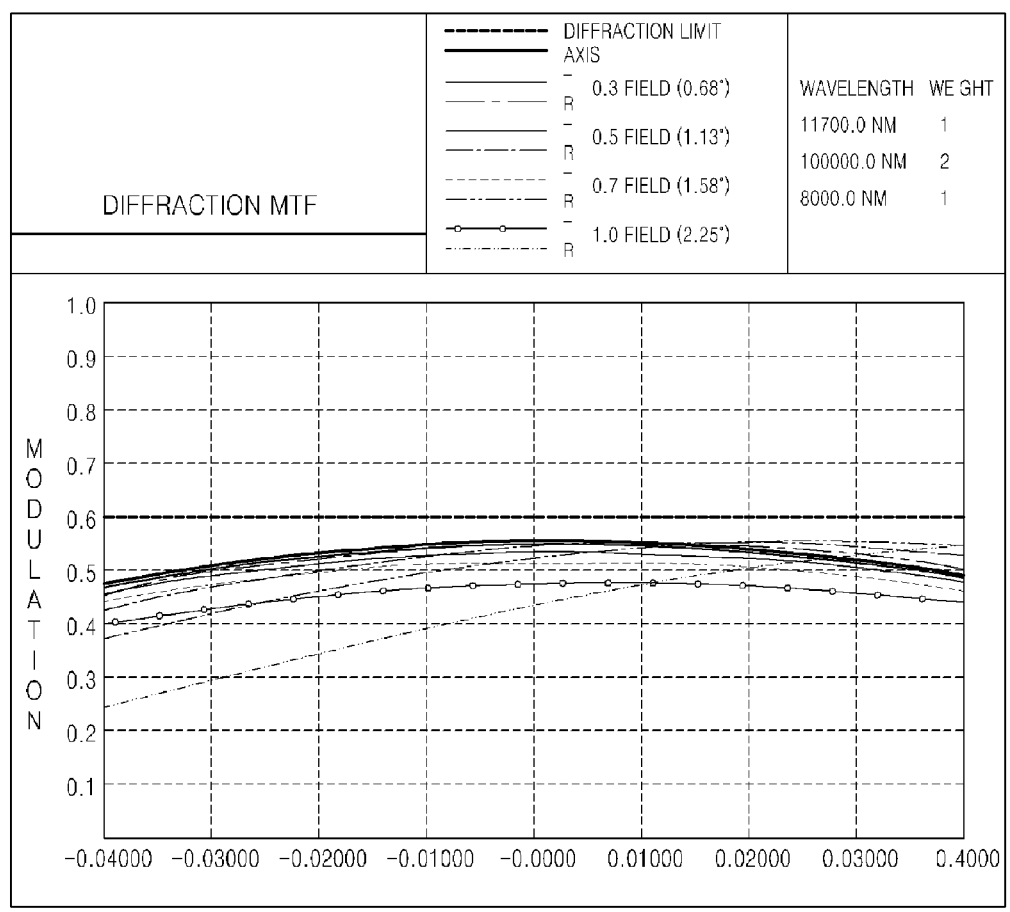
FIG. 10 illustrates through focus MTF graph of the infrared optical lens system illustrated in FIG. 6, according to an exemplary embodiment.

FIG. 7 illustrates field comatic aberrations of the infrared optical lens system 2 illustrated in FIG. 6, and FIG. 8 illustrates longitudinal spherical aberrations, astigmatism, and distortion aberrations of the infrared optical lens system 2 illustrated in FIG. 6. FIG. 9 illustrates a relative illumination of the infrared optical lens system 2 illustrated in FIG. 6, and FIG. 10 illustrates a through focus MTF graph of the infrared optical lens system 2 illustrated in FIG. 6. In an astigmatic field curve of FIG. 8, a dotted line denotes tangential astigmatic aberration, and a solid line denotes sagittal astigmatic aberration.

Referring to Table 4 and FIGS. 7 through 10, in the infrared optical lens system 2 according to the embodiment of FIG. 6, the first lens 10 has only one aspheric surface which faces the image I. Although only one surface of the first lens 10 is an aspheric surface, spherical aberration may be effectively removed.

Third Embodiment

Table 5 shows design data of the infrared optical lens system 3 according to the embodiment illustrated in FIG. 11, and Table 6 shows aspheric coefficients of the infrared optical lens system 3 illustrated in FIG. 11.

In the embodiment of FIG. 11, the first lens 10 includes germanium, the second lens 20 includes GASIR1, and the third lens 30 includes AMTIR4. The first lens 10 may have a positive refractive power, the second lens 20 may have a negative refractive power, the third lens 30 may have a positive refractive power, and the aperture ST is located in a vicinity of the first lens 10 that faces the object O.

F=70 mm
Fno=1.4

TABLE 5

| # | R | Dn | material |
|---|---|---|---|
| S1 (ST) | 48.3326 | 7 | germanium |
| S2* | 58.8275 | 26.8593 | |
| S3 | 45.2899 | 3.5 | GASIR1 |
| S4* | 29.2733 | 13.9418 | |
| S5 | 191.2567 | 4 | AMTIR4 |
| S6 | −233.1996 | 16 | |

TABLE 6

| # | $a_4$ | $A_6$ | $a_8$ |
|---|---|---|---|
| 2 | 1.3109E−09 | −4.1293E−12 | −3.8003E−15 |
| 4 | 1.703E−06 | 8.7791E−09 | 4.9059E−11 |

Figure 12:
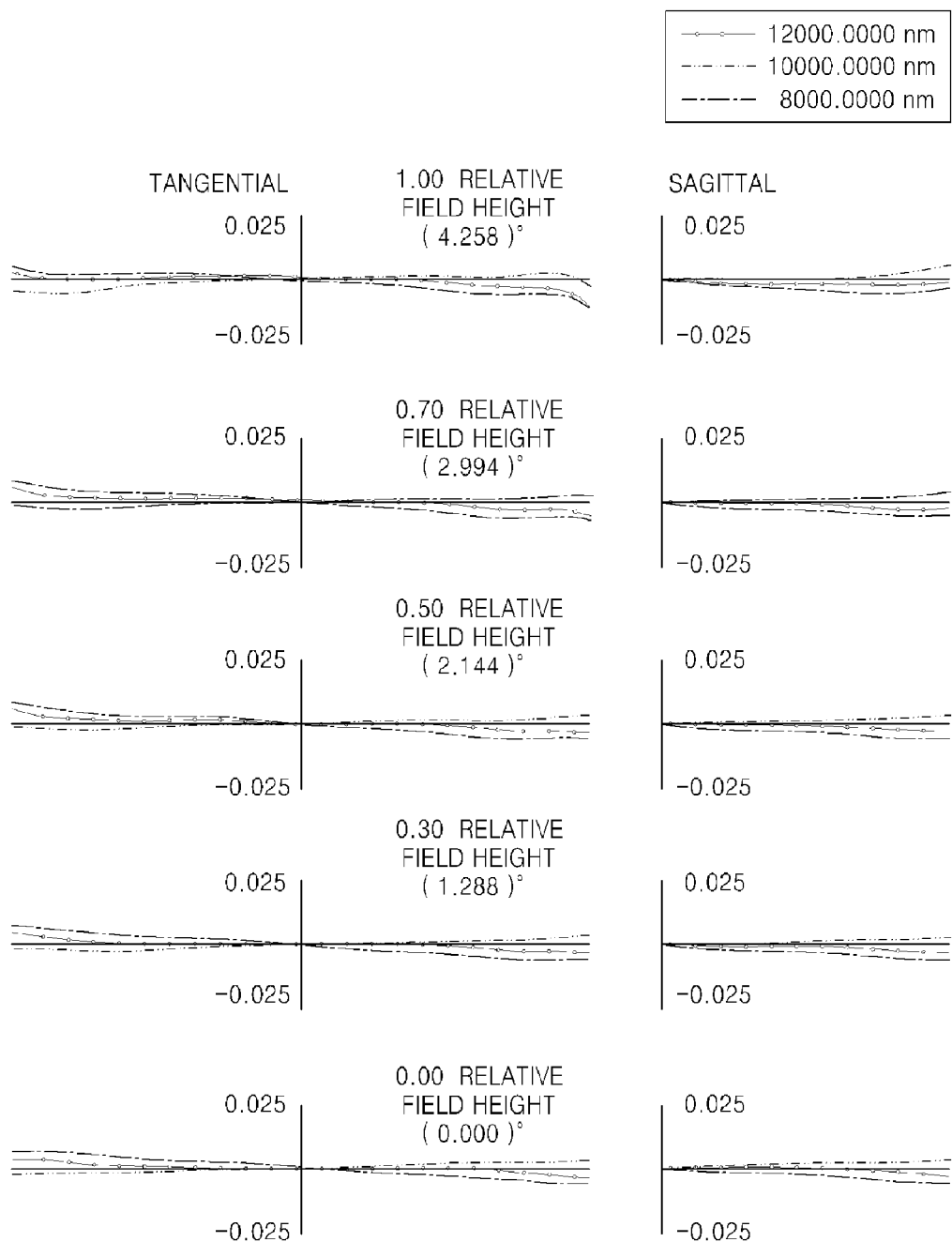
FIG. 12 illustrates field comatic aberrations of fields of the infrared optical lens system illustrated in FIG. 11, according to an exemplary embodiment.
Figure 13:
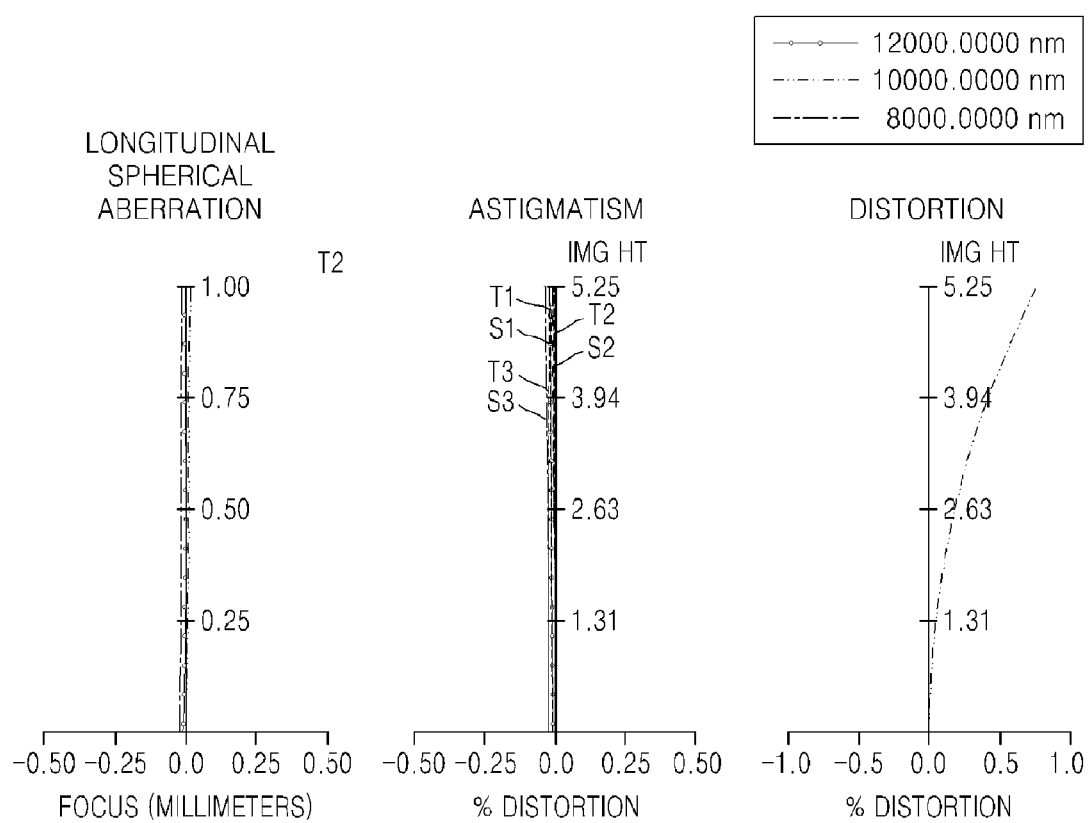
FIG. 13 illustrates longitudinal spherical aberrations, astigmatism, and distortion aberrations of the infrared optical lens system illustrated in FIG. 11, according to an exemplary embodiment.
Figure 14:
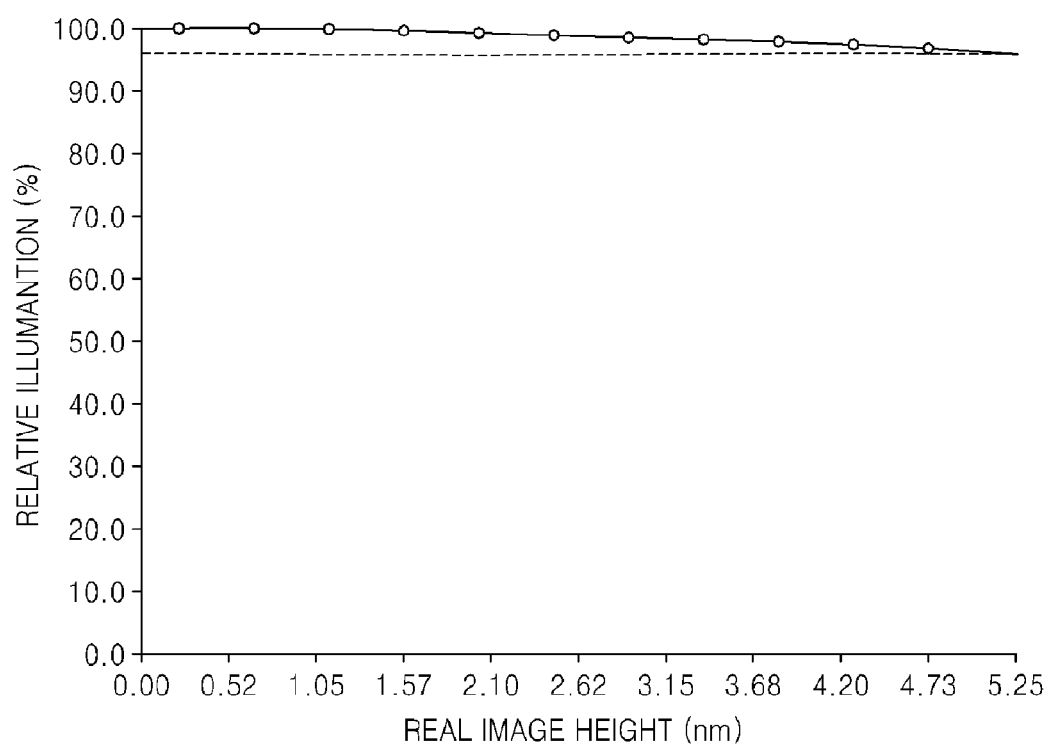
FIG. 14 illustrates a relative illumination of the infrared optical lens system illustrated in FIG. 11, according to an exemplary embodiment.
Figure 15:
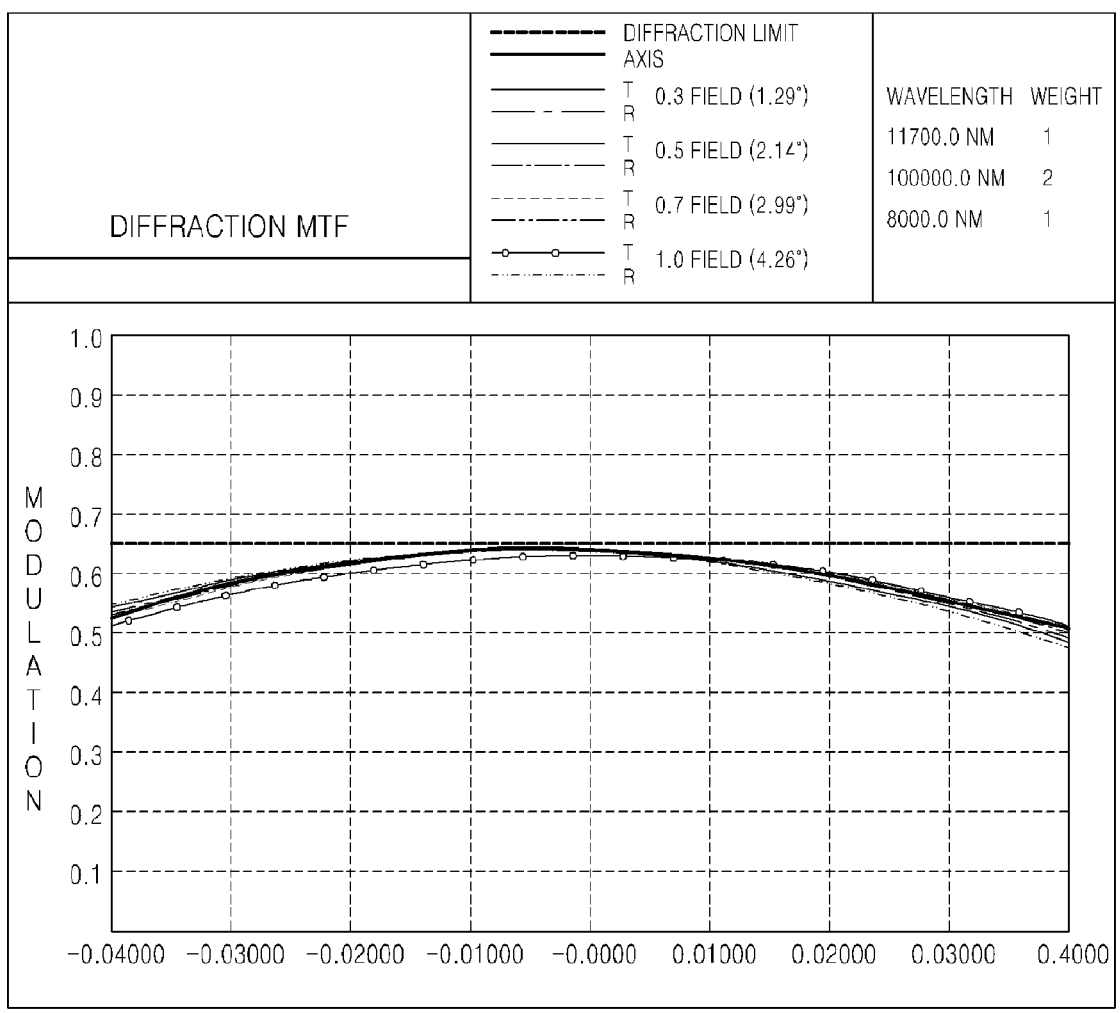
FIG. 15 illustrates a through focus MTF graph of the infrared optical lens system illustrated in FIG. 11, according to an exemplary embodiment.

FIG. 12 illustrates comatic aberrations of fields of the infrared optical lens system 3 illustrated in FIG. 11, and FIG. 13 illustrates longitudinal spherical aberrations, astigmatism, and distortion aberrations of the infrared optical lens system 3 illustrated in FIG. 11. FIG. 14 illustrates a relative illumination of the infrared optical lens system 3 illustrated in FIG. 11, and FIG. 15 illustrates a through focus MTF graph of the infrared optical lens system 3 illustrated in FIG. 11. In an astigmatic field curve of FIG. 13, a dotted line denotes tangential astigmatic aberration, and a solid line denotes sagittal astigmatic aberration.

Referring to Table 6 and FIGS. 12 through 15, in the infrared optical lens system 3 according to the embodiment of FIG. 11, the first lens 10 has only one aspheric surface which faces the image I. Although only one surface of the first lens 10 is an aspheric surface, spherical aberration may be effectively removed. Referring to FIG. 15, the infrared optical lens system 3 according to the embodiment may improve resolution due to the inclusion of the third lens 30.

The infrared optical lens systems 1, 2, and 3 according to the embodiments may sense infrared rays that are radiated from a subject, for example, far infrared rays in a wavelength bandwidth range of about 8 um to about 12 um, and the sensed infrared rays may be changed into images by a detecting device (not shown).

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An infrared optical lens system comprising:
a first lens which comprises a crystalline material; and
a second lens which comprises an amorphous material and is formed by using molding processing,
wherein a refractive index of the first lens is greater than a refractive index of the second lens,
wherein the first lens and the second lens are disposed in an order from an object to an image,
wherein only the first lens and the second lens, without any other lenses, are disposed between the object and the image, and
wherein a focal distance of the infrared optical lens system is equal to or greater than 100 mm.

2. The infrared optical lens system of claim 1, wherein the focal distance of the infrared optical lens system is in a range of 100 mm to about 150 mm.

3. The infrared optical lens system of claim 1, wherein the first lens comprises at least one aspheric surface.

4. The infrared optical lens system of claim 1, wherein the first lens comprises an aspheric surface that faces the image.

5. The infrared optical lens system of claim 1, wherein the second lens comprises at least one aspheric surface.

6. The infrared optical lens system of claim 1, wherein a refractive index of the first lens is from about 3.2 to about 4.1.

7. The infrared optical lens system of claim 6, wherein a refractive index of the second lens is from about 2.45 to about 2.65.

8. The infrared optical lens system of claim 1, wherein a refractive index of the second lens is from about 2.45 to about 2.65.

9. The infrared optical lens system of claim 1, wherein the first lens has a positive refractive power and the second lens has a negative refractive power.

10. The infrared optical lens system of claim 1, wherein the amorphous material comprises a chalcogenide material.

11. An infrared optical lens system comprising:
a first lens which comprises a crystalline material; and
a second lens which comprises an amorphous material,
wherein the first lens and the second lens are disposed in an order from an object to an image and transmit infrared rays,
wherein a refractive index of the first lens is greater than a refractive index of the second lens,
wherein only the first lens and the second lens, without any other lenses, are disposed between the object and the image, and
wherein a focal distance of the infrared optical lens system is equal to or greater than 100 mm.

12. The infrared optical lens system of claim 11, wherein the crystalline material is selected from the group consisting of germanium, ZnSe, ZnS, sapphire and silicon.

13. The infrared optical lens system of claim 11, wherein at least one of a surface of the first lens which faces the image and a surface of the first lens which faces the object is an aspheric surface.

14. The infrared optical lens system of claim 13, wherein at least one of a surface of the second lens which faces the image and a surface of the second lens which faces the object is an aspheric surface.

15. The infrared optical lens system of claim 11, wherein both a surface of the first lens which faces the image and a surface of the first lens which faces the object are aspheric surfaces.

16. The infrared optical lens system of claim 15, wherein both a surface of the second lens which faces the image and a surface of the second lens which faces the object are aspheric surfaces.

17. The infrared optical lens system of claim 11, wherein the amorphous material comprises a chalcogenide material.

* * * * *